United States Patent
Nomura et al.

[11] Patent Number: 5,975,882
[45] Date of Patent: Nov. 2, 1999

[54] MOLDED OPTICAL COMPONENT WITH GATE STUBS REMOVED FROM PERIPHERAL RIM PORTIONS

[75] Inventors: Yoshimitsu Nomura; Youhei Shinozawa; Masaaki Fukuda, all of Omiya, Japan

[73] Assignee: Fuji Photo Optical Co., Ltd., Omiya, Japan

[21] Appl. No.: 08/921,341

[22] Filed: Aug. 29, 1997

[30] Foreign Application Priority Data

Sep. 3, 1996 [JP] Japan .................................. 8-250880

[51] Int. Cl.⁶ .................................................. B29D 11/00
[52] U.S. Cl. ........................................ 425/808; 451/42
[58] Field of Search ..................................... 409/132, 138, 409/139, 140, 199, 190; 451/42, 43; 264/1.1; 425/808

[56] References Cited

U.S. PATENT DOCUMENTS

| | | | |
|---|---|---|---|
| 4,203,183 | 5/1980 | Pavlovsky | 409/140 |
| 4,647,261 | 3/1987 | Schaffner | 409/138 |
| 4,836,722 | 6/1989 | Kurita et al. | 409/132 |
| 5,403,131 | 4/1995 | Susnjara | 409/138 |
| 5,564,871 | 10/1996 | Lagsdin | 409/138 |

FOREIGN PATENT DOCUMENTS

| | | | |
|---|---|---|---|
| 52-71789 | 6/1977 | Japan | 409/138 |
| 59-93211 | 5/1984 | Japan | 409/132 |

*Primary Examiner*—Daniel W. Howell
*Assistant Examiner*—Christopher Kirkman
*Attorney, Agent, or Firm*—Oblon, Spivak, McClelland, Maier & Neustadt, P.C.

[57] ABSTRACT

A molded optical component which is comprised of a lens portion, an annular outer rim integrally formed around the circumference of the lens portion, an annular reference surface formed on the circumference of the outer rim in a predetermined width along one end thereof, and an obliquely cut surface formed across the circumference of the outer rim by stripping a gate stub therefrom. The obliquely cut surface is extended from the other end of the outer rim up to a position falling short of near boundaries of the reference surface. A gate stub is removed from the molded optical component by bringing cutting edges of a rotary cutting tool into engagement with a circumferential portion of the outer rim at a predetermined angle of inclination with center axis of the latter thereby to remove circumferential portions of the outer rim including the gate sub and to form an obliquely cut surface crosswise of the circumference of the outer rim from the other end thereof up to a position falling short of the reference surface.

1 Claim, 4 Drawing Sheets

MOLDED OPTICAL COMPONENT WITH GATE STUBS REMOVED FROM PERIPHERAL RIM PORTIONS

BACKGROUND OF THE INVENTION

1. Field of the Art

This invention relates generally to molded plastic optical components like plastic lenses, and more particularly to molded plastic optical components which are stripped of gate stubs, which remain on the molded optical components after gate cutting, and a method for machining outer rims of molded optical components to get rid of gate stubs therefrom.

2. Prior Art

Plastic optical components including plastic lenses are used on a diversity of optical appliances. For instance, plastic objective lenses are used on optical pickup devices of various optical disc drives. Objective lens of this sort are usually fitted in lens holders of pickup devices and thereby retained correctly in an optically aligned position. As means for correctly positioning a lens component within a lens holder, it has been the general practice to provide an outer rim portion around the circumference of each lens component. For facilitating the lens mounting correctly in a predetermined position on or within a lens holder, the outer rim portion is formed in an annular or cylindrical shape which can be easily fitted in an optically aligned position within a lens holder.

The lens portion and the outer rim portion of an optical component are preferred to be formed as one integral body, and, for this purpose, plastic injection molding is widely resorted to in the manufacture of optical components of this sort. The mold for use in such plastic injection molding process is provided with a cavity of predetermined shape including transfer surfaces which define the surface contour of a lens to be molded. Molten synthetic resin material injected into the mold is cured to shape within the mold cavity to obtain moldings with lens surfaces copied from the transfer surfaces of the mold cavity. Molten synthetic resin material is injected into the mold cavity through a sprue which is provided in a mold assembly as a resin feed passage. The sprue is connected to the mold cavity through a gate or a constricted passage in order to fill the resin material in the entire mold cavity.

In the injection molding process, surplus resin material remains and cures in the sprue and gate which is connected to the mold cavity, so that a molding operation is usually followed by the so-called gate-cut operation to cut off the gate or the surplus resin material from the molded products of optical components. Of course, the gate cut can be carried out within the mold in case a movable cutter member is operatively provided within a mold assembly. However, since the provision of a movable cutter within a mold will lead to complication of the mold construction or other problems, it is desirable to carry out the gate cut on a molded optical component after ejection from a mold. After cutting off the surplus resin material or the gate in an initial stage of gate cut, however, there still remains a gate stub which more or less projects radially outward from the circumference of the outer rim portion of each molded optical component. Therefore, in a nest or final stage of gate cut, the gate stub has to be removed from each molded product by the use of a cutting tool.

This final stage of gate cut, which is directed to the removal of gate stubs bears a great influence on the quality of final products as optical components.

Ultimately, each one of molded optical components has to be mounted accurately in an optically aligned position on a holder means no matter whether it is a lens holder on an optical pickup of an optical disc drive or of other optical appliances. For this purpose, a reference surface which matches a reference surface on the part of a lens holder is formed on each optical components during the molding process. Normally, a reference surface of this sort is formed on an outer rim portion of each optical component, more particularly, on one end face and an adjoining circumferential surface of an outer rim portion. On the circumferential side, the reference surface is normally provided to cover part of the axial length of the outer rim portion contiguously from one end face of the latter, instead of covering the entire axial length of the outer rim, and in such a position as to evade a gate-cut portions on the circumference of the outer rim. Should the reference surface be damaged by a cutter blade in a gate-cut operation, the resulting surface flaw could make it difficult to assemble the optical component into an optically aligned position on a lens holder. Therefore, in the final stage of gate cut, namely, in the stage of removing a gate stub on the circumference of the outer rim portion of a molded optical component, a cutting tool should be kept out of contact with the reference surface on the circumference of the outer rim portion.

The gate-cut portion on the circumference of an outer rim of a molded optical component basically has nothing to do with the positioning of optical element on a lens holder, so that, with a lens holder of a certain shape, the existence of a small gate stub or surface ruggedness resulting from an incomplete gate cut may not give rise to problems in particular when mounting the optical component on a lens holder later on. In this connection, however, it is necessary to take into consideration that, for the convenience of handling in a subsequent inspection stage or in an actual mounting stage, a large number of molded optical components are usually accommodated in a jig in the form of a tubular stick. Further, since the gate cut is usually restricted to a minimum necessary amount for the purpose of preventing the reference surface from being damaged by a cutting tool as mentioned above, it is very likely that surface condition of the gate-cut portions vary between individual molded components and relatively large projections remain on some optical components as gate stubs. Because of irregularities in surface ruggedness at gate-cut portions, in some cases it becomes difficult to insert molded optical components into a jig stick, and in the worst case the insertion itself is impossible. If forcibly pushed into a stick, there will occur jamming troubles at the time of discharging optical components out of the jig stick, making it difficult to mount the optical components automatically by the use of a robot machine. Nevertheless, the moldings with such incomplete gate-cut portions are not necessarily defective in optical quality, and are usable after corrective machining of the incomplete gate-cut portions.

For the reasons as stated above, high precision gate cutting would require to position each molded optical component precisely relative to a cutting tool in an extremely strict manner. Besides, because of annular ring-like shape of the outer rim portion, there has been another problem that strict control of positions and movements of cutting tool and optical components is possible only by the use of an apparatus of relatively large-scale involving complicate control mechanisms.

SUMMARY OF THE INVENTION

With the foregoing situations in view, it is an object of the present invention to provide a method of removing gate stubs accurately form circumferential surfaces of molded optical components by a machining operation which is confined substantially to actually necessary areas on the circumference of each molded optical component, leaving other areas in unaffected, intact state.

It is another object of the present invention to get rid of gate stubs which remain at gate-cut portions on outer rims portions of molded optical components, by the use of a cutting tool which is kept away from reference surfaces on the circumference of outer rim portions of the molded optical components throughout a machining operation to prevent damages particularly to the reference surfaces.

It is still another object of the present invention to provide a method of removing gate stubs from molded optical components in a quick and reliable manner involving only simple motions.

It is a further object of the present invention to provide a method of removing gate stubs from molded optical components by the use of a cutting tool which can leave machined surfaces of improved surface accuracy on the circumference of molded optical components after removal of gate stubs.

It is a further object of the present invention to provide a method of removing gate stubs from molded optical components in such a way as to create a machined surface which can serve as an index of optical directionability of the molded optical components.

In accordance with the present invention, the above-stated objectives are achieved by the provision of a molded optical component, which is comprised of: a lens portion; an annular outer rim integrally formed around the circumference of the lens portion; an annular reference surface formed on the circumference of the outer rim in a predetermined width along one end thereof; and an obliquely cut surface formed across the circumference of the outer rim by stripping a gate stub therefrom, the obliquely cut surface being extended from the other end of the outer rim up to a point falling short of boundaries of the reference surface.

In accordance with the present invention, there is also provided a method for stripping a gate stub from a molded optical component having a lens portion, an annular outer rim integrally formed around the circumference of the lens portion, and an annular reference surface formed on the circumference of the outer rim in a predetermined width along one end thereof and bearing a gate stub on the circumference thereof as a result of a preceding gate cutting operation, the method comprising the steps of: bringing cutting edges of a rotary cutting tool into engagement with a circumferential portion of the outer rim at a predetermined angle of inclination with center axis of the latter thereby to remove circumferential portions of the outer rim including the gate sub and to form an obliquely cut surface across the circumference of the outer rim from the other end thereof up to a point falling short of near boundaries of the reference surface.

Preferably, the cutting tool to be used in the above-described method is an end mill type machine tool. For removing the gate stub on the circumference of the outer rim, the molded optical component is moved relative to the cutting tool in contact with cutting edges of the latter. A cutter portion of the end mill is adjusted to such a length which would not reach the reference surface on the circumference of the outer rim. Accordingly, the reference surface on the circumference of the outer rim can be maintaining in intact state through the machining operation, without any possibility of being damages by contact with the cutter portion of the end mill even if the molded optical component is set in a slightly deviated position relative to the cutting tool. The cutting tool is provided with a cutter portion of either truncated conical shape or cylindrical shape at its fore end to be brought into contact with the molded optical component. In the case of a conical cutter, the cutting tool is put in rotation about a vertical axis parallel with center axis of the outer rim of the molded optical component. In the case of a cylindrical cutter, the cutting tool is put in rotation about an axis which is set at a predetermined angle of inclination with center axis of the outer rim. In any case, the fore end of the cutter is kept out of contact with the reference surface on the outer periphery of the outer rim.

BRIEF DESCRIPTION OF THE DRAWINGS

The above and other objects, features and advantages of the present invention will become apparent from the following particular description of the invention, taken in conjunction with the accompanying drawings which show by way of example some preferred embodiments of the invention and in which.

DESCRIPTION OF PREFERRED EMBODIMENTS

Figure 1:
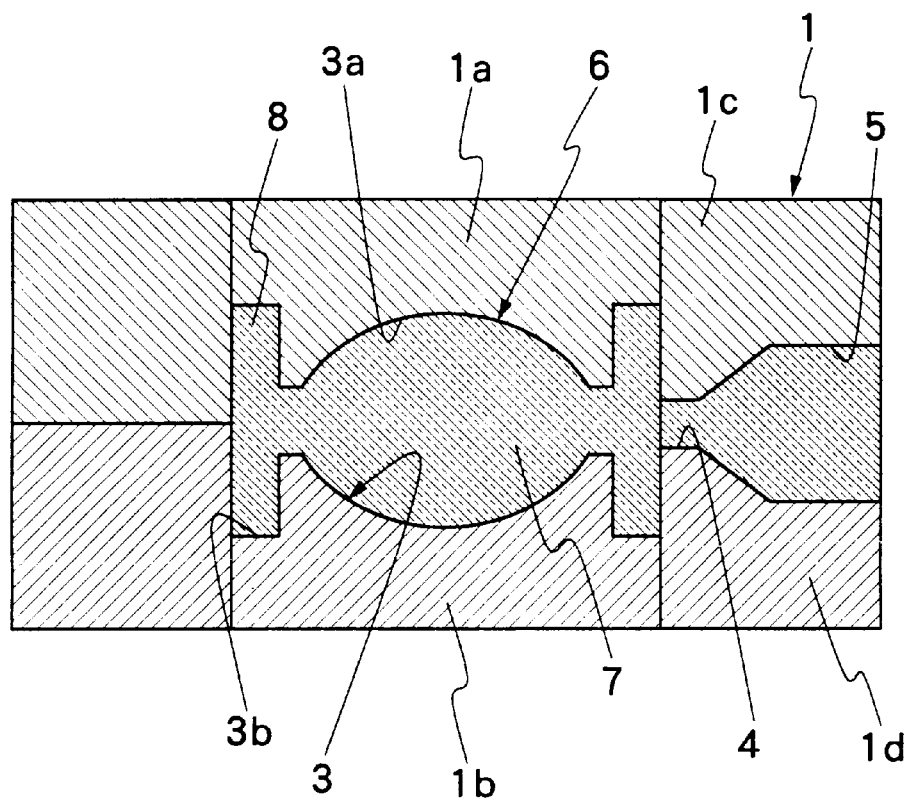
FIG. 1 is a schematic sectional view of a mold to be used in injection molding of optical components.
Figure 2:
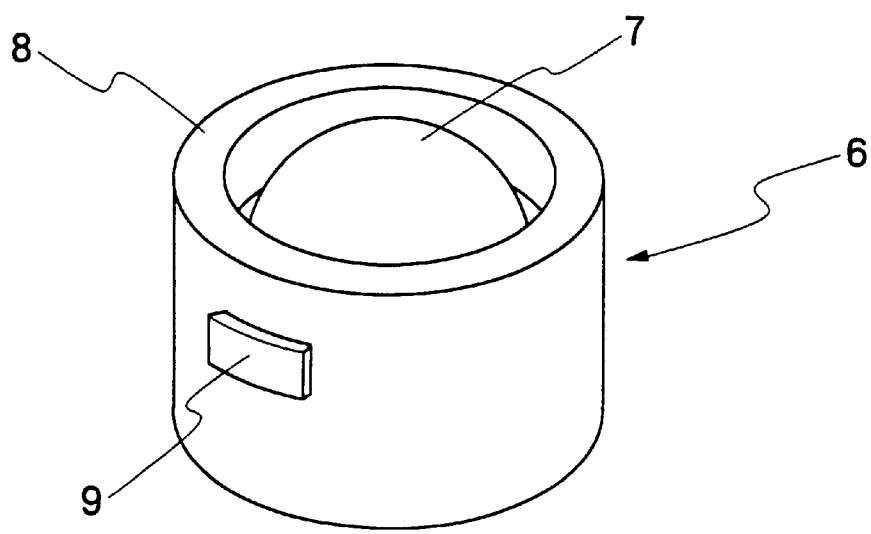
FIG. 2 is a schematic perspective view of an optical component molded by the use of the mold of FIG. 1.
Figure 3:
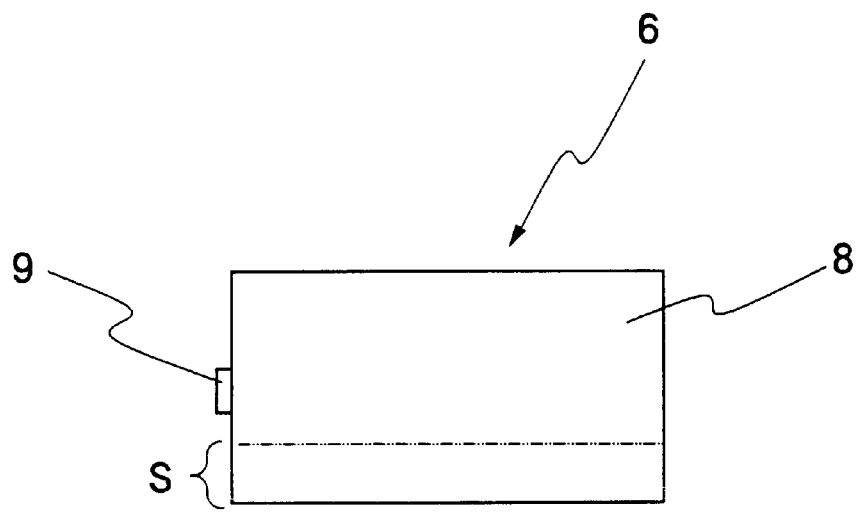
FIG. 3 is a front view of the same molded optical component.

Hereafter, the invention is described more particularly by way of its preferred embodiments with reference to the accompanying drawings. As a typical example of molded optical components, the following description shows an objective lens which is produced by a method as illustrated in FIGS. 1 to 3. However, it is to be understood that the present invention is similarly applicable to molded optical components other than objective lenses.

Shown in FIG. 1 is a mold assembly 1 to be used in injection molding of an optical component 6 as shown in FIG. 2. The mold 1 is comprised of, for example, four pieces 1a to 1d which are assembled together as shown in FIG. 1. In the assembled state, upper and lower molds 1a and 1b define therebetween a cavity 3 in communication with a gate 4 and a sprue 5 which are formed between upper and lower gate shells 1c and 1d. The gate 4 constitutes a constrictive passage at the junction of the sprue 5 with the mold cavity 3. The mold cavity 3 includes a lens forming portion 3a of concave shape on the upper and lower sides thereof, and a cylindrical rim forming portion 3b which is provided contiguously with the lens forming portion 3a on the outer side thereof, while the gate 4 is opened into a circumferential portion of the outer rim forming portion 3b of the mold cavity 3.

After assembling the respective pieces of the mold 1 as shown in FIG. 1, an injection nozzle of an injection molding machine is connected to the sprue 5 of the mold assembly 1 to inject molten synthetic resin into the mold cavity 3 under predetermined pressure from the injection head through the sprue 5 and gate 4 to fill the mold cavity 3 completely with the molten resin, followed by a cooling to let the injected resin material cure to shape. After cooling, the mold 1 is disassembled and opened to obtain a molded optical component 6 as shown in FIG. 2. The molded optical component 6 is constituted by a lens portion 7 and an annular ring-like outer rim 8 which surrounds the lens portion 7. At this stage, the surplus resin from the gate 4 and the sprue 5 is still connected to a circumferential portion of the outer rim 8. This surplus is cut off at the gate portion by the so-called gate cutting. As mentioned hereinbefore, the gate may be cut off in a final stage of a molding process or after the molded product has been ejected from the mold 1 in a stage subsequent to a molding process.

Figure 4:
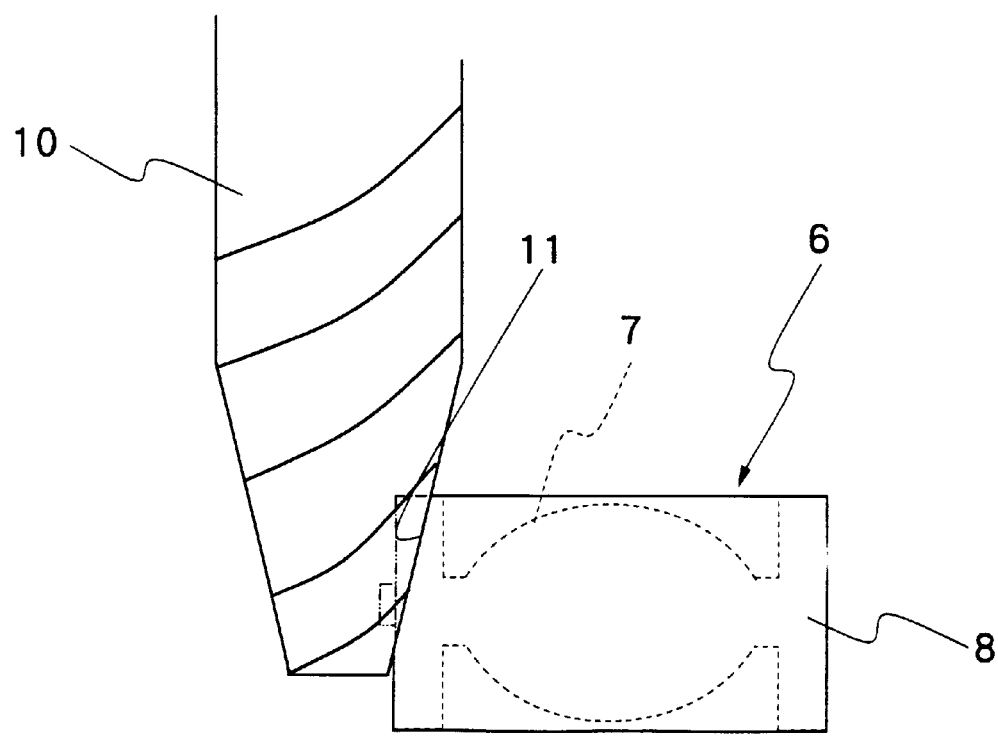
FIG. 4 is a schematic illustration of a method of machining a gate-cut portion on the circumference of a molded optical component according to the present invention.

In a gate cutting stage, the surplus resin from the sprue 5 is simply cut off roughly without machining a gate-cut portion into a surface grade which is almost congruous with other surfaces on the circumference of the outer rim 8 of the molded optical component. In a subsequent finishing stage, a gate stub which projects at a gate-cut portion on the circumference of the outer rim 8 is removed completely by a circumferential machining operation which is substantially confined to a gate-cut portion on the circumference of the outer rim 8. As described hereinbefore, the outer rim 8 is formed in an annular ring-like shape, and provided with a reference surface S in a predetermined width from one end face to adjoining lower circumferential surfaces thereof. In this connection, since the gate 4 is opened into the mold cavity 3 at a position which is largely spaced from the reference surface S, a gate stub 9 is normally located away from the reference surface S. The gate stub 9, which remains on the outer rim portion 8 after a gate cut, is removed by a circumferential machining operation using a cutting tool 10 which is, for example, an end mill with a cutter of substantially truncated cone shape as shown in FIG. 4.

Molded optical components 6 coming out of a molding process are transferred forward by a moldings transfer jig which is provided with clamp means for holding the molded products in a fixed state. On the other hand, the cutting tool 10, which is located over a transfer path of the molded optical components 6, is put in rotation and brought into contact with the latter to machine an upper circumferential portion of the outer rim portion 8 of the optical component 8, which contains a gate stub 9. Accordingly, if a molded optical component 6 is so positioned on the transfer jig as to bring the gate stub 9 on the outer rim 8 into contact with a conical cutter at the fore end of the cutting tool 10, upper circumferential portions of the molded optical component 6, including the gate fin stub 9, are obliquely cut off as indicated by an imaginary line in FIG. 4. In so doing, depending upon the feed distance of the molded optical component 6, the cutting tool 10, which is provided with a cutter of conical shape as described above, can always be kept out of contact with the outer rim portion 8 over a certain length from the fore distal end of the cutter even if the cutting tool 10 has an effective cutting length in excess of the height of the outer rim portion 8.

In this circumferential machining operation, the cutting tool 10 is brought into contact with the outer rim 8 from the upper side of the molded optical component 6, that is to say, from the side away from the reference surface S. Besides, the cutting tool 10 is controlled to remove circumferential portions of the outer rim 8 obliquely, at least up to a point immediately on the lower side of the gate stub 9, and not reaching a point which borders on the reference surface S. More specifically, the machining range by the cutting tool 10 should preferably be delimited to a point intermediate between the gate stub 9 and the reference surface S. Actually, since the reference surface S is formed in a distant position from the gate stub 9, it would become necessary to feed the molded optical component 6 over a relatively large distance until the cutting tool 10 reaches the reference surface S after completely stripping the gate stub 9. Therefore, despite slight positional deviations which may exist between the molded optical component 6 and the cutting tool 10, the gate stub 9 can be removed securely without causing damages to the reference surface S. Upper circumferential surfaces of the outer rim portion 8, in contact with the conical cutter at the fore end of the cutting tool 10, are machined into a flat surface 11 which is inclined correspondingly to the angle of the conical cutter of the cutting tool 10.

Figure 5:
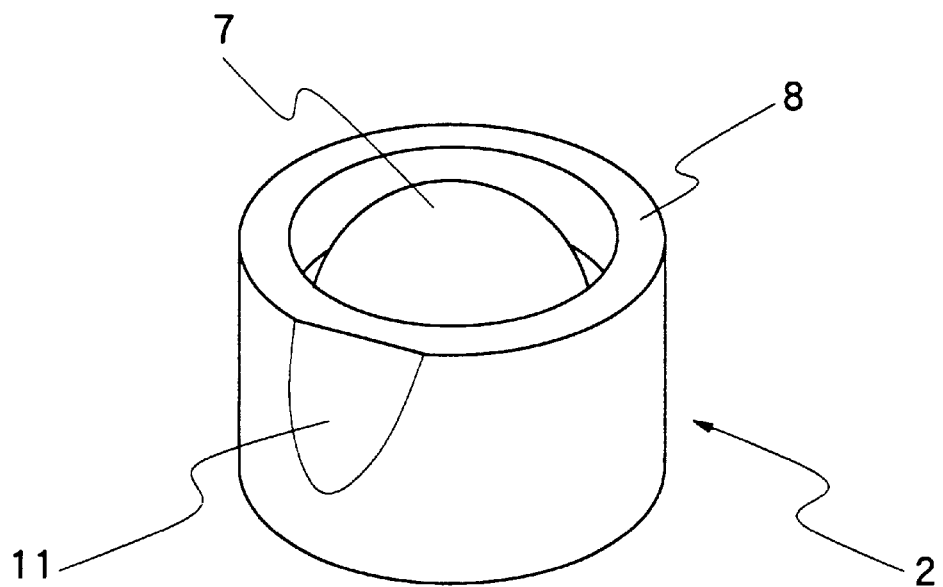
FIG. 5 is a schematic perspective view of an optical component with an obliquely cut surface as a result of circumferential machining according to the method of the present invention.

By setting, as described above, the relative positions of the outer rim portion 8 of the molded optical component 6 and the cutting tool 10, which is located over a transfer path of molded products, upper circumferential portions of the outer rim portion 8, including a gate stub 9, are removed by the cutting tool 10 to form an oblique machined surface 11. Accordingly, the ultimate molded optical component, which has been stripped of the gate stub 9 by the above circumferential machining, is free of any obstructive surface projections on the circumference of its outer rim 8, as shown in FIG. 5. Besides, the obliquely machined surface 11 is connected with other circumferential surfaces of the annular outer rim 8, without forming any projections or stepped surfaces at its borders.

After removal of gate stubs from the outer rim 8 by the circumferential machining as described above, the molded optical components 2 can be smoothly charged into or discharged out of jig sticks or other cartridge means, completely free of the troubles which would otherwise be caused by remaining gate stubs, i.e., obstruction of insertion into jig sticks or jamming or stagnation of molded optical components within jig sticks. Accordingly, in handling the molded optical components in subsequent stages, they can be charged and discharged into and out of jig sticks smoothly in a secure manner. In addition, there is no possibility of the cutting tool 10 damaging the reference surface S since, as described hereinbefore, the cutting tool is arranged to keep fore end portions of its cutter in a position away from the reference surface S while removing the gate stub 9.

In the case of an objective lens for use on an optical disc drive, for example, it is required to project a noncircular light spot on an optical disc, namely, an elliptic light spot instead of a circular light spot. On the other hand, it is the general practice to employ on the optical pickup means a lens holder of a circular shape which is easier to fabricate and more reliable in terms of positioning accuracy. Therefore, of the two portions which constitute the molded optical component, the outer rim 8 is formed in a round ring-like shape which fits in a circular lens holder, without any indication of particular optical directionability of the lens portion 7. For the convenience in mounting optical components 2 of this sort in properly oriented positions on lens holders of optical pickup means, it is desirable for each molded optical component 2 to bear an index of optical directionability on some part of the outer rim 8.

In this regard, the obliquely machined surface 11 which is formed in a particular position on the circumference of the annular outer rim 8 can be utilized as an index of optical directionability of the optical component 2. For this purpose and in order to position the molded components 6 accurately on the transfer jig, the obliquely machined surfaces 11 is preferred to be uniform in breadth, direction and angle. As long as the machined surfaces 11 are formed uniformly in these respects, they can be conveniently used as a directional index at the time of setting the optical components on lens holders of optical pickup means. Although the circumference of the outer rim 8, which is of true circular shape, is partly waned as a result of the stub-removing operation, this will not give rise to any problem in setting the molded component in an optically aligned position as long as its true circular shape is retained intact on the reference surface S. On the contrary, as mentioned above, the waned portion can serve as a directional index in setting the molded component in position on an optical system.

Figure 6:
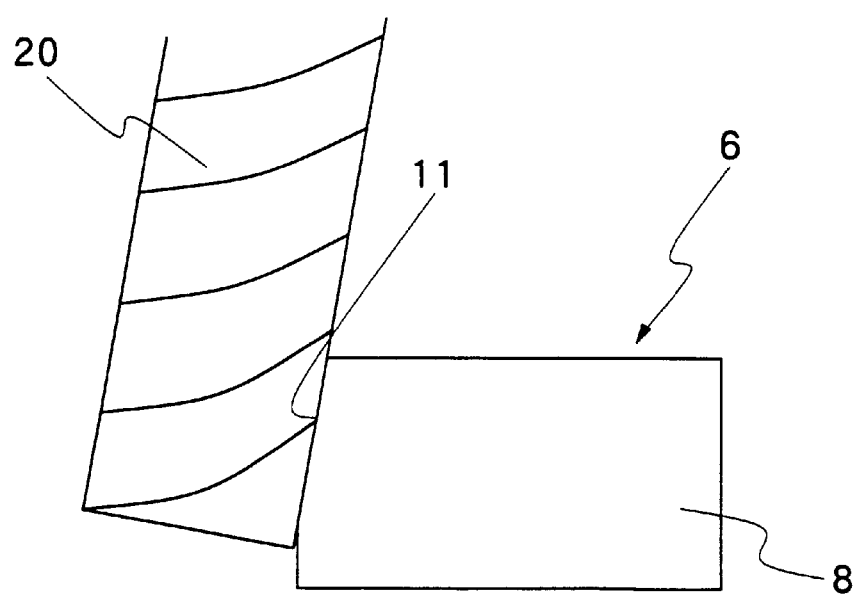
FIG. 6 is a schematic illustration of another embodiment of the method of machining a gate-cut portion on the circumference of a molded optical component according to the present invention.

In the case of a cutting tool 10 which is provided with a cutter of conical shape at its fore end, it is arranged to rotate in a vertical position on a cutting machine, that is to say, to rotate about a vertical axis to reduce a gate-cut portion on the circumference of an outer rim 8 into a flatly machined surface 11. Alternatively, in the case of a cutting tool 20 with a cutter of substantially cylindrical shape as shown in FIG. 6, it is arranged to rotate about an axis which is inclined at a predetermined angle with the outer rim 8 of a molded component 6. Similarly, the cutting tool 20 should be of such a length that, when moved to a lowermost position relative to the molded component 2, fore end portions of its cutter will fall short of or stay out of contact with the reference surface S on the circumference of the outer rim 8, maintaining the latter intact throughout the circumferential machining operation.

Figure 7:
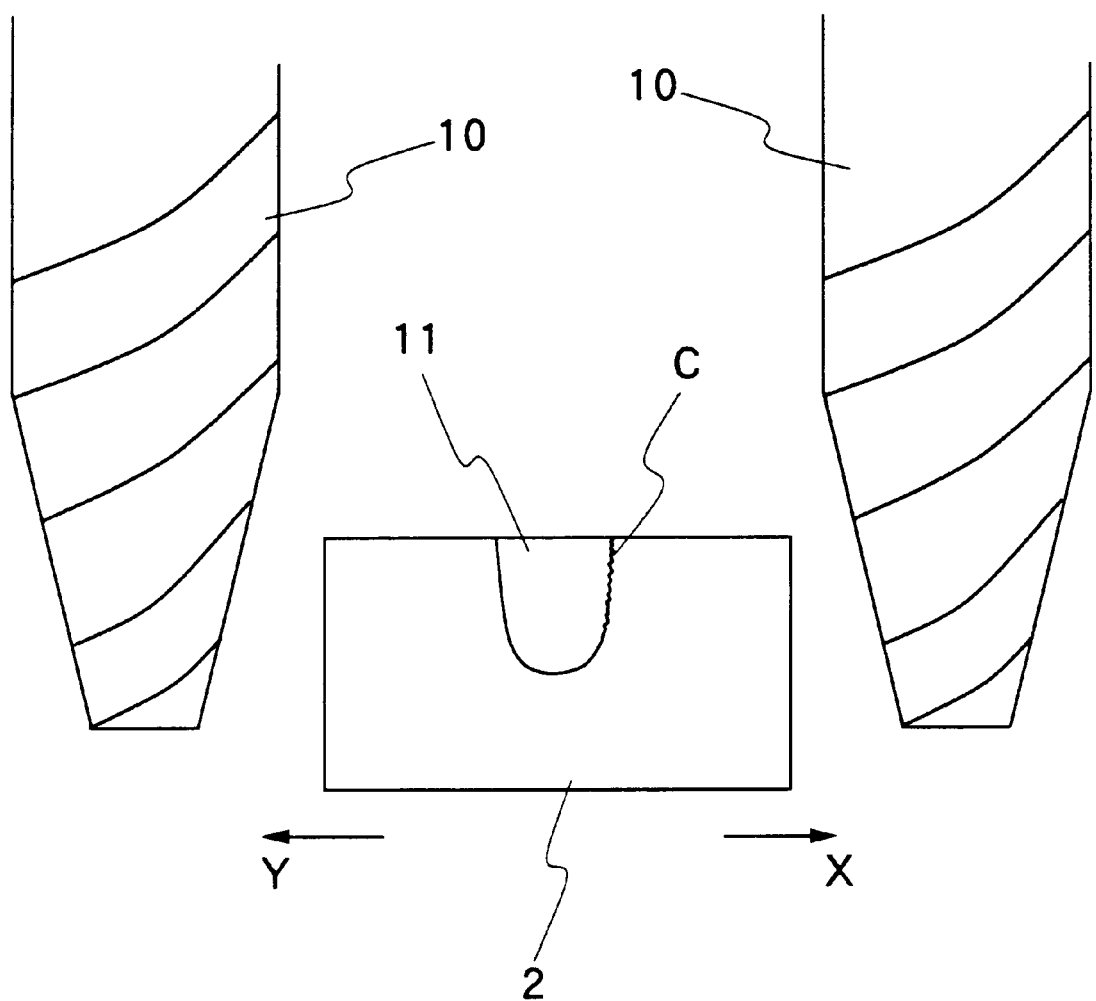
FIG. 7 is a schematic illustration of still another embodiment of the method of machining gate-cut portion on the circumference of a molded optical component according to the present invention.

No matter which one of the above-described cutting tools 10 and 20 is used, the circumferential machining is started by obliquely abutting the cutter against a gate-cut portion on the circumference of the outer rim 8 of the molded optical component 6. As indicated at C in FIG. 7, the cutting tool 10 or 20 may leave rugged surfaces at circumferential portions where it is initially abutted against the outer rim 8, and may necessitate to smoothen out the surface ruggedness by a buffing operation. Rugged surfaces of this sort can be smoothened out automatically by firstly moving the molded component 6 in the direction of arrow X in FIG. 7 in contact with the cutting tool 10 to get rid of a gate stub and then moving the molded component 6 in the reverse direction (in the direction of arrow Y) for retouching the rugged surfaces with the cutting tool 10. At this time, since the gate cut portion has already been machined into a flat surface 11, there is no possibility of the outer rim 8 being cut further by the cutting tool 10 even if it is brought into contact with the latter again. However, the surface ruggedness which occurs at the opposite side of the machined surface 11 at the instant of disengagement of the cutting tool 10 from the outer rim 8 can be suitably smoothened out by the contact with the cutting tool 10 in the reverse direction. Consequently, in this case, a smoothly machined surface 11 of higher surface accuracy can be formed by the gate-stub stripping operation.

It is to be understood that the above-described method of the invention can be practised by the use of existing machining equipments, and various modifications or alterations can be added thereto within the scope of the invention as defined in the appended claims.

What is claimed is:

1. A molded plastic optical component, comprising:

a lens portion;

an annular outer rim integrally formed around the circumference of said lens portion;

an annular reference surface formed on the circumference of said outer rim in a predetermined width along one end thereof; and an obliquely cut surface formed crosswise of the circumference of said outer rim by stripping a gate stub therefrom, said obliquely cut surface being extended from the other end of said outer rim up to a position falling short of boundaries of said reference surface.

\* \* \* \* \*